United States Patent [19]

Schott

[11] 4,113,915

[45] Sep. 12, 1978

[54] GLASS BEAD PRODUCT

[76] Inventor: Charles W. Schott, 175 Carmella Dr., McKeesport, Pa. 15131

[21] Appl. No.: 680,691

[22] Filed: Apr. 27, 1976

Related U.S. Application Data

[60] Division of Ser. No. 515,191, Oct. 16, 1974, abandoned, which is a continuation-in-part of Ser. No. 291,262, Sep. 22, 1972, Pat. No. 3,856,899, which is a continuation-in-part of Ser. No. 35,962, May 11, 1970, Pat. No. 3,694,528.

[51] Int. Cl.$^2$ .............................................. C03B 19/10
[52] U.S. Cl. ........................................ 428/402; 65/21; 106/47 R; 264/8; 428/406
[58] Field of Search ...................... 65/20, 21; 428/402, 428/406; 63/2, 32; 425/332; 273/58 R; 106/47 R, 52, 53, 54, 290; 350/105; 427/163, 86; 264/8

[56] References Cited

U.S. PATENT DOCUMENTS

| | | | |
|---|---|---|---|
| 2,533,633 | 12/1950 | Schott | 65/20 |
| 2,691,248 | 10/1954 | Ford | 428/406 |
| 3,047,409 | 7/1962 | Slayter et al. | 65/3 B |
| 3,054,139 | 8/1962 | Bartholomew et al. | 65/21 |
| 3,104,164 | 9/1963 | Osborne | 65/21 |
| 3,149,016 | 9/1964 | Tung et al. | 65/21 |
| 3,171,827 | 3/1965 | De Vries et al. | 350/105 |
| 3,325,341 | 6/1967 | Shannon | 428/406 |
| 3,428,514 | 2/1969 | Greer et al. | 428/402 |
| 3,499,745 | 3/1970 | Plumat | 65/21 |
| 3,594,142 | 7/1971 | Margesson et al. | 65/20 |
| 3,607,169 | 9/1971 | Coxe | 65/21 |

OTHER PUBLICATIONS

Baumann, Collecting Antique Marbles, Wallace–Homestead, 1970, pp. 69, 70.

*Primary Examiner*—Ralph S. Kendall
*Attorney, Agent, or Firm*—Buell, Blenko & Ziesenheim

[57] ABSTRACT

An apparatus for making beads and a bead product are provided in the form of a member rotatable about a generally vertical axis having an outer peripheral edge adapted to discharge molten material in the form of pellets as the member rotates, means for creating heat on said member sufficient to maintain a molten layer of material being discharged on the walls of said member and fluid cooling means receiving discharged pellets which may be glassy generally spherical particles as solids or having frothy uniform voids surrounded by a glassy smooth surface or having integral crystalline elements.

3 Claims, 6 Drawing Figures

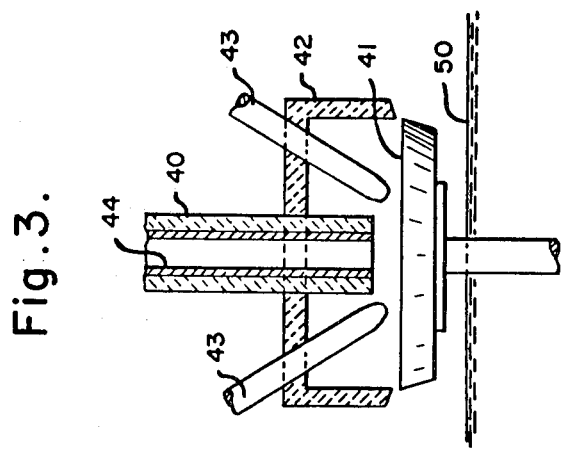
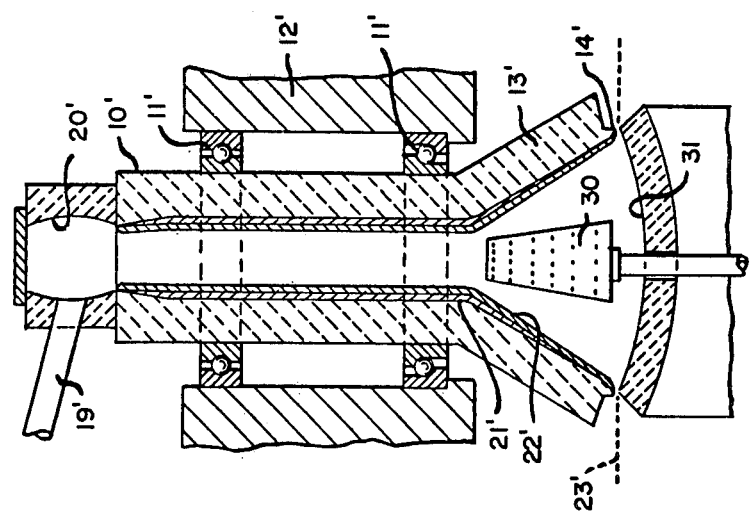
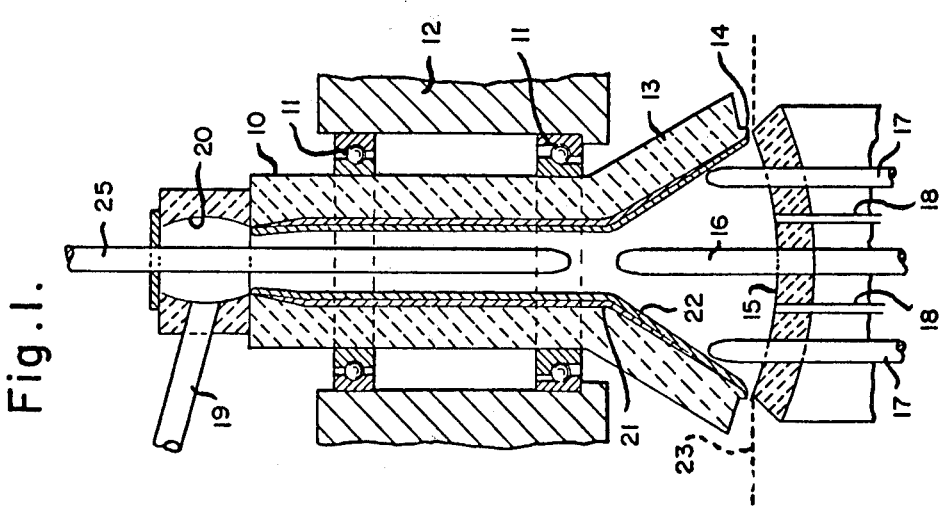

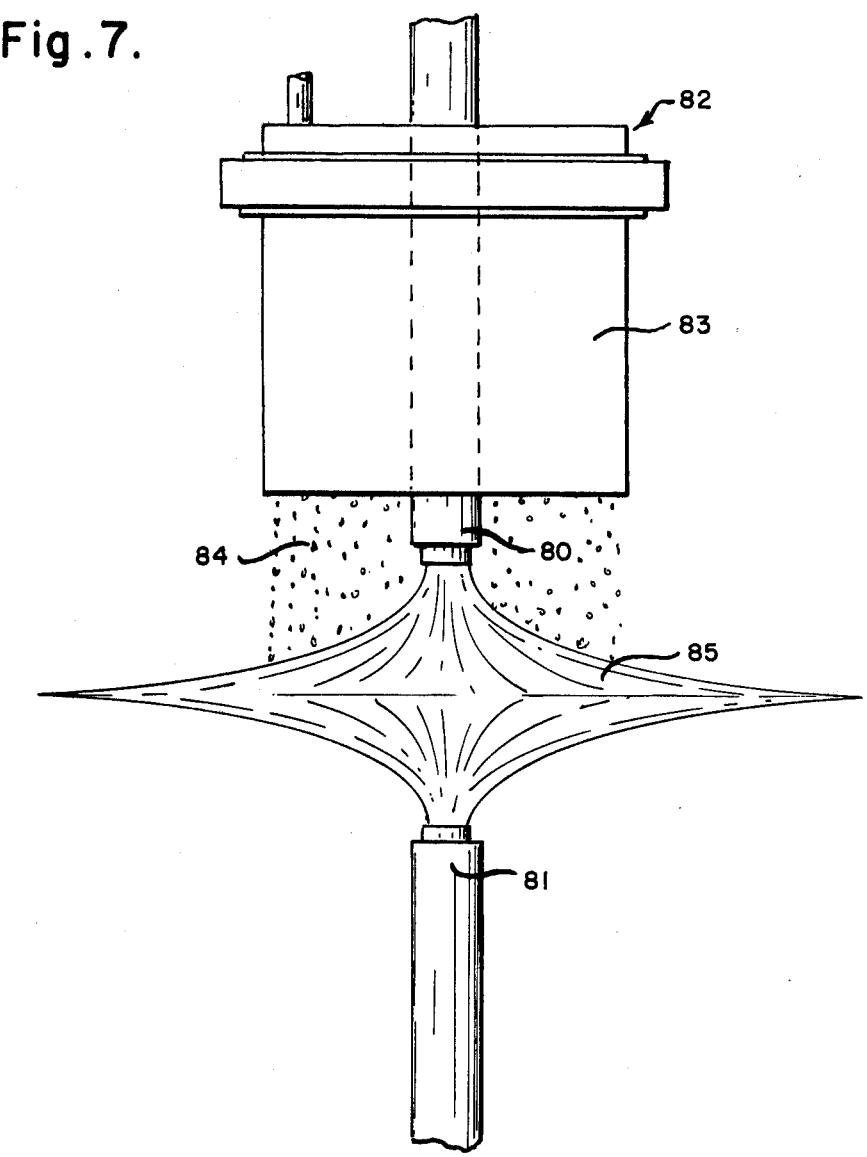

GLASS BEAD PRODUCT

This application is a division of my copending application, Ser. No. 515,191, filed Oct. 16, 1974, now abandoned which was a continuation-in-part of my copending application Ser. No. 291,262, filed Sept. 22, 1972 U.S. Pat. No. 3,856,899 which was in turn a continuation-in-part of Ser. No. 35,962, filed May 11, 1970 U.S. Pat. No. 3,694,528.

This invention relates to apparatus for making solid or cellular beads and to a bead product and particularly to apparatus for making beads from materials such as glass, slag, alumina, and other high melting point materials, earths, metals and the like and to the resulting bead product.

There is a very substantial demand for solid and high strength beads, both solid and cellular, of a great variety of materials such as glass, slag, metal and the like. These beads are used for a great variety of purposes, e.g., as proppants in oil well drilling, as reflectors in reflective paints, etc. There is particularly a need for an apparatus for converting metallurgical slag to high strength low porosity pellets suitable for substitution for glass pellets. There is in addition a recently developed need for simulated lunar materials to be used as comparison samples in the study of lunar soil samples.

I have discovered an apparatus which provides unique control over the bead formation and permits beads to be made of almost any normally solid material in its molten state. I have found, for example, that by maintaining a reducing condition at the apparatus, I can make blast furnace slag beads which have a crystalline structure. With the same material, I can produce a transparent amorphous pellet under neutral and mildly oxidizing conditions or with a highly oxidizing condition, I can produce a black, shiny, glass-like opaque bead. Thus, I have a very high degree of control over the product which is produced by the apparatus of my invention.

Preferably I feed molten material to be pelletized or formed into beads axially downwardly through a rotating refractory tube through a controlled atmosphere and discharge the same horizontally from the rotating circular edge or alternatively I rotate a solid consumable member to be pelletized while melting and maintaining a constant flow of pellets from the end thereof. The rotating tube may be of refractory material or it may be formed of a non-refractory shell having an inner refractory lining. By refractory I mean any material (ceramic or metal) capable of withstanding the destructive effect of the temperature and material being handled. Preferably the beads or pellets are discharged horizontally across a fluid coolant so that they contact the surface of the coolant in a rolling action effecting rapid submergence which reduces the temperature rapidly without undue shock and permits the material to reach equilibrium. The refractory tube is preferably formed of carbon terminating in a generally frusto conical shape with the molten material being fed in at the smaller end and discharged from the periphery of the larger bottom end. The tube is rotated and the bottom circular edge acts as the discharge edge or a stationary tube may discharge centrally onto a rotating disc at its bottom, which disc provides the rotating circular discharge edge. Similar, where a solid consumable member is used, and by solid I include a member having a hollow axis, the member is rotated while being lowered axially into or toward a heat source and a conical depression formed from melting and discharging pellets from the edge, essentially as in the case of the carbon tube. The controlled atmosphere may be reducing, neutral or oxidizing and may be created, at least in part by a carbon arc within the tube or by a gas burner within the tube. Preferably the heat source is in the form of two opposing heating members which may be opposing electrodes or opposing gas burners between which the molten material is heated.

Oxidizing atmosphere may be created in conjunction with the carbon arc by permitting air to flow upward over the surface of the molten material while the carbon arc operates centrally within the tube. Air is highly heated as it passes between the arc and the surface of the molten material. The valve at the top of the tube controls this flow of air.

In the foregoing description of my invention, I have set out certain objects, purposes and advantages of this invention. Other objects, purposes and advantages of this invention will be apparent from a consideration of the following description and the accompanying drawings in which:

FIG. 1 is a side elevation, partly in section of an apparatus according to this invention;

FIG. 2 is a side elevational view of a second embodiment of an apparatus according to my invention;

FIG. 3 is a side elevational view partly in section of a third embodiment of an apparatus according to this invention;

FIG. 7 is a section through another embodiment of apparatus for practicing this invention.

Figure 4:
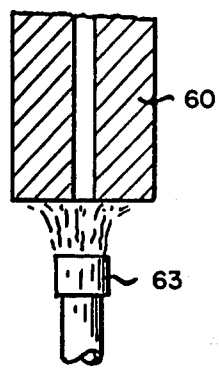
FIG. 4 is a side elevational view, partly in section of a solid consumable member according to my invention.

Referring to the drawings and particularly to FIGS. 1-3, I have illustrated a graphite tube 10 mounted in an annular support ring 11 rotatable on spaced supports 12. The tube 10 is enlarged at its lower end into a frusto conical member 13 having a machined annular discharge lip 14. A concave reflector 15 is shown beneath the frusto conical member 13 with its edge parallel to and spaced from the outer edge of the frusto conical member 13. The heat reflector may be any other suitable shape e.g. convex, or frusto conical, or pointed, as desired because the heat reflector does not engage the molten material. A central electrode 16 allowing vertical movement and lateral electrodes 17 are provided in the reflector 15 extending upwardly into the cone 13. These electrodes are connected to a source of electrical current (not shown) for causing an arc to move from one to another of said electrodes whereby a high temperature may be created within the area beneath the cone 13. Inlet nozzles 18 are provided in the reflector 15 to permit air or other gas to be introduced into the area beneath the cone 13 whereby the nature of the atmosphere surrounding the molten material within the cone can be controlled. The molten material to be pelletized or beaded is introduced through inlet pipe 19 into a feeder 20 which discharges into the top of tube 10. Molten material is introduced into feeder 20 and distributed along the inner wall of the tube 10. The first such material will solidify to form a thin protective lining 21 along the inner wall of the tube 10 and cone 13 after which the molten material 22 will flow downwardly along the inner wall of tube 10 and cone 13 and be discharged as pellets 23 or beads from the rotating periphery of discharge lip 14. The thickness of the protective lining 21 may be controlled by heating or cooling tube 10 with an air blast or a blast of hot gases or by changing the rate of feed. The ring 11 is driven by a motor 24 through a gear train 24a.

A carbon electrode 25 may extend downwardly in tube 10 to be used with or alternatively to electrodes 17.

The foregoing arrangements permit great latitude in the control of fluidity of the molten material in tube 10. It provides the following possibilities:

(a) Arc heating wherein the arc moves between electrodes 16 and 25 and in which the position of the arc may be adjusted by vertical movement and lateral movement of the electrodes 16 and 25;

(b) Resistance heating wherein the lateral electrodes 17 are of opposite polarity and the circuit is completed through the molten material 22.

(c) A combination of arc and resistance heating using the several electrodes at the same time.

The size of the beads or pellets produced by the foregoing apparatus can be adjusted by the rate of feed of molten material into the tube, by the speed of rotation of the tube, by the degree of flair or slope at the frusto conical end of the tube, by the temperature at the discharge end of the tube or by any combination thereof. Cellular beads possessing very uniform bubbles have been produced from slags and glass when the molten material is subjected to the high temperature carbon vapor zone of the arc provided the carbon vapor zone is located close to the discharge edge of the apparatus. This creates a reducing condition. The molten material foams, but is discharged immediately (in pellet form) from a near horizontal plane.

Cellular beads of this type may be discharged on a cool flat solid surface such as concrete, metal or in air.

The apparatus illustrated in FIG. 2 is essentially the same as that of FIG. 1 except that instead of the electrodes for heating, I provide a generally conical gas burner 30 centrally of reflector 31. All other parts are identical and bear like numbers with the addition of a prime sign.

The apparatus illustrated in FIG. 3 provides a hollow graphite feed tube 40 extending vertically above a rotating disc 41. A heat reflector hood 42 surrounds the feed tube 40 and extends to a point adjacent the periphery of disc 41. Electrodes 43 extending downwardly through the hood may be adjusted so as to contact molten material on disc 41 and heat by resistance or they may be used to arc above the material to form an arc heating system or a combination of the two. Molten material 44 to be pelletized or beaded is fed into the upper end of tube 40 and flows down onto the axis of rotating disc 41 where it moves radially outwardly to the edge forming a film over the disc and is discharged as beads. The electrodes 43 are used to heat the molten material to increase its fluidity or to add carbon or to otherwise modify it as has already been discussed in connection with FIG. 1.

Figure 6:
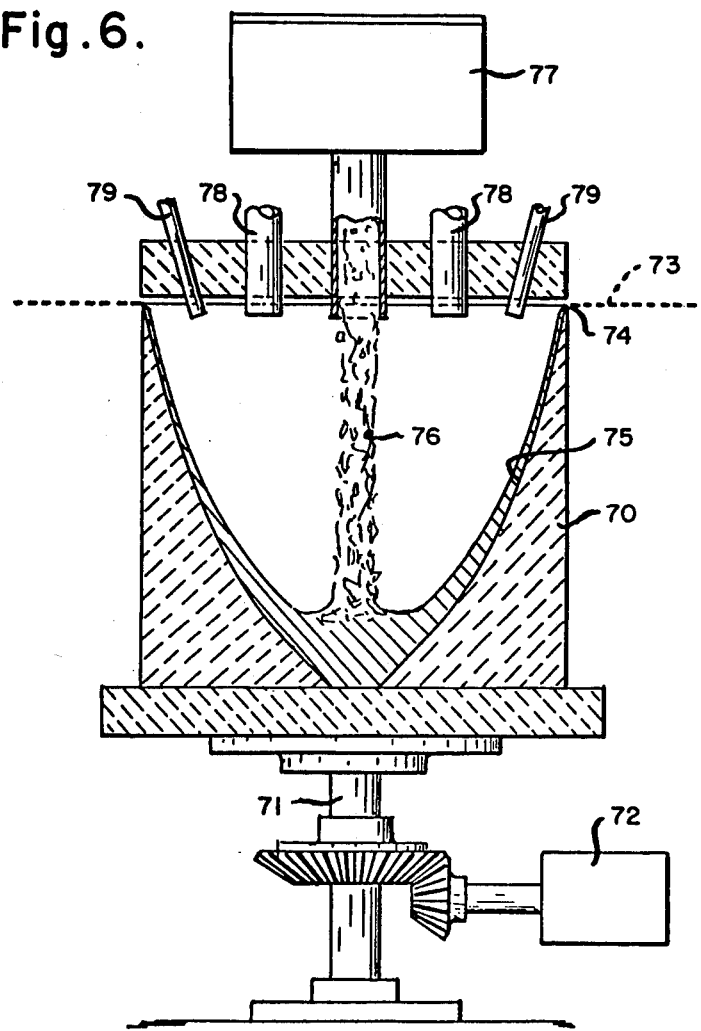
FIG. 6 is a section through still another embodiment of means for practicing this invention.

In FIG. 6 I have illustrated the inverted equivalent of the apparatus of FIG. 1. In this form a crucible 70 on shaft 71 driven by motor 72 is rotated about a vertical axis to discharge pellets 73 from lip 74 of interior conical surface 75. Molten or solid material 76 is fed from reservoir 77. Heat is provided by gas flames 78. A gaseous atmosphere may be provided by tube 79.

Figure 5:
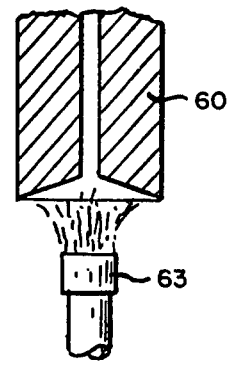
FIG. 5 is a side elevational view of the member of FIG. 4 during pelletizing.

The feed tube may be a consumable tube 60 which itself supplies the material for pelletizing as shown in FIGS. 4 and 5. For example scrap pipe may form the tube and be melted at its lower end while being rotated at high speed thus causing beads to be discharged.

Before starting the rotation and melting the consumable tube could have an end 61 as shown in FIG. 4. After the process has been operating the consumable tube develops a cone shaped depression 62 as shown in FIG. 5. The cone shaped depression may be altered by changing the heat source 63 size and intensity with respect to the diameter of the element. It is desired to maintain the cone shape depression because in so doing, the discharge rim is easier to maintain and the cone depression tends to concentrate the applied heat and restrain both the heat and flowing material for most efficient operation. The greatest heat is applied to the center of the cross section and maintains the cone shaped depression as the tube (element) rotates.

The consumable element may be made of a great variety of materials and in different ways. The consumable element may be made up of compacted particles of glass, slag, earths, metals, plastics and minerals; it may be made of wrought elements such as rolled, forged or extruded metals, glass, earths, metals, plastics and minerals; it may be a cast element of any material; or it may be a fabricated element of any finely divided material in a pipe, a wire mesh tube or any other restraining means capable of restraining the materials during rotation. A suitable binder may be used or metal chips or turnings incorporated into the mixture and compacted to aid in holding the element together. Under neutral or reducing conditions any added metal used as a restraining means will separate from non-metals at the discharge rim during pelletization.

In the case of operating a conical feed source, the rate of feed and amount of heating may in all cases be regulated by the shape of the tube. For example the tube may be enlarged intermediate its ends so as to retard downward movement. With such an apparatus "fly ash" can be melted and pelletized in the tube without prior melting.

In FIG. 7 I have shown a pair of opposing gas burners 80 and 81 in a vertical axis arrangement with a rotating pelletizer 82. The upper burner 80 is surrounded with a housing 83 through which finely divided particles 84 of feed stock such as slag, glass cullet or the like are fed onto the circular flame zone 85 where they are heated and melted and discharged as beads as herein described. The opposing burners may feed opposing streams of fuel for heating the particles or a mixture of fuel and air or one may feed fuel and the other air or oxygen or any combination thereof. The fuel may be any combustible gas, oil or powdered coal. This opposing burner arrangement produces a very hot and efficient flame that burns in a lateral direction in a continuous circle which is superior to the orifice type burner used in other forms of this invention.

The form of the flame circle produced by the opposing burners 80 and 81 may be varied by varying the distance between burners, by changing the relative pressures in the opposing burners so that the flame can have a top surface which is convex, concave, or substantially flat.

The apparatus of my application can perhaps be best understood by describing it in connection with the treatment of blast furnace slag to pelletize the same.

Molten slag is caused to flow through the spinning tube which possesses great conductive ability for the inherent heat of the process.

The initial flow of molten material enters the top end of the tube, but due to the tube's heat conductivity, the material begins a progressive solidification against the inside wall (I.D.) which forms a lining from top to bottom of the tube. Because of the rapid solidification and release of gases during solidification the lining forms a porous insulating barrier between the tube wall and the molten material that continues to flow. It is to be understood that the lining is solid against the tube wall and possesses a temperature gradient which increases in the direction away from the tube wall so that the lining nearest the central axis of the tube is at approximately the same temperature as that of the feed molten material.

The thickness of the lining may be controlled by extracting more or less heat through the tube walls via air or water spray cooling as well as rate of feed.

I have found that for a spinning graphite tube having a ⅛ inch thick wall the boundary air on the outside surface is sufficient to maintain a ⅛ inch thick lining over the I.D. even though a carbon arc was maintained within ½inch of the lining. The arc was maintained with 5/16 inch electrodes at 75 amps + 30 volts.

After the above mentioned lining is formed molten slag continues to flow through the tube in a downward direction until it reaches the discharge end.

In this process, a continuous flowing film of molten material is formed from the point of feed-in at the top of the tube to the discharge point at the bottom of the tube. The discharge point is the point at which the film reaches its maximum diameter and contact with its restraint is eliminated.

The restraint may be a flat disc (FIG. 3) over which the molten material is urged to flow as a film in contact with the entire disc surface or the restraint may be a short truncated cone section (FIGS. 1 and 2) with concavity sloping upward or downward or the restraint may be a saucer-shaped disc. The shape of the restraint may be selected according to the length of time the molten material is to be subjected to any desired set of conditions.

A straight cylindrical tube offers the shortest film spread because in this cae the molten material will be in partial restraint over only the distance of the wall thickness from supply to pelletizing or rupture point.

ACTION AT DISCHARGE POINT

I have found that transparent pellets may be produced from furnace slag merely by causing molten slag to react with the boundary air that attends a spinning shape.

The reaction between molten blast furnace slag and air is exothermic and continues to completion as the slag remains molten and has an adequate supply of air contacting the surface. The various elements in blast furnace slag (and other furnace slags as well) which are capable of being oxidized such as carbon, sulfur, carbon monoxide, etc. will react with air to produce heat and aid pelletization and I have taken full advantage of this phenomenon in my process.

In my work I have found that blast furnace slag that possesses the elements normally inherent in the slag at the time of discharge from the furnace may be (while still molten) spun through air with the result that the slag changes from a limey crystalline appearance progressively to a transparent amorphous appearance. The lead side of the slag becomes clear first and this will continue as long as the slag remains molten and air is present until the entire mass becomes transparent.

In my process I control the rate and duration of this exothermic reaction and dictate the time prior to pelletization that the reaction will take place.

I produce crystalline pellets from furnace slags by processing the slag in an air excluded atmosphere. In other words, I process the slag in its own gases while maintaining a molten state just sufficient to cause pellets to form at the discharge end of the apparatus. At the discharge point or zone I maintain an ambient atmosphere of a reducing nature again, excluding air so that the forming pellets do not react to become transparent and noncrystalline.

I have found that blast furnace slags for example is highly absorbant relative to carbon from carbon bearing gases at temperature ass low as 1600° F. This absorption can be made to take place in a carbonaceous atmosphere without causing bubbles to form within the slag.

CRYSTALLIZATION OF GLASSY COMPOSITIONS

When glassy compositions such as may be derived from blast furnace slag, for example, are reheated, the glassy material becomes opaque because of the growth of crystals within the glassy material.

Definite visible evidence of the crystallization is obtained at about 1600° F. The degree of crystallization increases as the reheat temperature increases and time is prolonged and as the cooling time is prolonged.

In my work, using glassy spherules of typical blast furnace slag compositions, I have found that the crystal growth starts at the surface of the spherule and progresses inwardly as heating continues. Eventually the entire spherule is recrystallized. The process will follow the teachings of a phase diagram for the selected composition.

It has been found that as the crystals grow inwardly pressure is built up within the spherule and at reheat temperatures of about 1900° to 2200° F. the pressure becomes great enough to cause rupture to take place followed by the ejection of a liquid (liquid phase of the composition) through the cracks in the spherule surface.

When heating is continued the ejected liquid will crystallize with ejection of more liquids from the original ejecta.

The applicant provides this product and the process as a means or a tool to explain why large size glassy shapes are rarely found in Lunar Soil samples and it explains the shock metamorphism theory. It is suggested by the applicant that the rupture through the crystalline structure may cause characteristics to develop that are identical to those produced by impact.

I have transformed transparent amorphous slag into crystalline opaque slag merely by heating the transparent slag in a carbonaceous (reducing) atmosphere. The reaction was evident at temperatures as low as 1600° F.

In my process I produce crystalline pellets merely by processing the molten slag in its own gases and maintaining a carbonaceous atmosphere through the pelletizing stage of operation. This carbonaceous atmosphere is blown through the opening between the heat reflector and the ends of the tube (or if a flat disc is used between the heat reflector and the edge of the rotating disc). The atmosphere envelopes the pellets as they fly to the coolant and solidify. Note, in the production of transparent non-crystalline pellets the carbonaceous atmosphere is omitted and an atmosphere equivalent to air is substituted within the lowr end of the tube and is blown out in the same manner so as to form an oxidizing or neutral envelope.

DISRUPTION OR PELLETIZING WITH FLOWING PRESSURIZED GAS AT HIGH TEMPERATURES.

During normal operation of this invention using a closed end rotating vessel with the heat reflector in position and while injecting gas or air through the ports in the heat reflector the hot gases blow through the opening between the rotating vessel and the heat reflector.

During such normal operation it has been found that if the volume of gas flowing through the opening is small, the velocity of the gas through the opening is correspondingly low and will not exceed the velocity of the molten material also flowing through the opening.

When the operation is conducted at high rotational speed and the atmosphere blown through the opening must be extended to cover the broader trajectory pattern of the pellets, the volume of gas or air injected into the rotating vessel is increased. This causes the velocity of hot gases through the opening to increase and surpass the velocity of the molten material also flowing through the opening. As a result, the high velocity gases produce a secondary pelletizing action in addition to the primary pelletization caused by the rotational forces alone.

A greater or more powerful disruption of the molten material results and finer or smaller sized products result. It has been found that spherules and crystals are thus produced at rates even greater than during normal operation where the gas velocity is less than or equal to the velocity of the discharging molten material.

I accordingly provide an apparatus for pelletizing and disintegrating a film of molten material into spherules and crystals through the action of a high velocity stream of hot gas or air upon a film of molten material wherein both the gases and the molten material are forced through the same opening and flow in the same direction.

Pelletizing methods of the prior art normally require that metal be excluded from the slag prior to pelletizing to avoid explosions.

In my process, separation of molten metal from the molten slag is not required. Infact, I have pelletized metal and slag simultaneously with no fear of explosions.

Separation of slag and metal may be made in the process and two useful spherical products result. Each will offset the cost of producing the other. This is unique to my invention.

In fact, I provide an apparatus for producing both metal shot and mineral pellets in one operation wherein waste materials such as metal chips and grinding dust are introduced into the tube or into the molten slag as it enters the apparatus (or prior to entry) and the combination is processed into pelletes of a useful nature.

It is well known that slags discharged from furnaces are well in excess, temperature wise, of their melting points or solidification points. If metal chips or grinding dust is added to the slag much of the excess temperature may be utilized to melt the metal. I have produced lead, copper, steel and nickel pellets simultaneous with slag and glass pellets in this method.

In regard to grinding dust resulting from grinding various grades of steel it is known that the grinding dust from stainless steel conditioning contains nickel, chromium, iron and other various valuable elements. Under the reducing conditions capable in this pelletizing method these elements can be recovered in the form of pellets.

Also, grinding dust contains approximately 10 to 15 percent $Al_2O_3$ which adheres tightly to the metal. This $Al_2O_3$ may be recovered and added to the slag composition thereby enhancing the properties of the slag.

Heavy additions of waste metal to liquid slag may be made and pellets of metal and slag produced or metal and slag solids or metal and glass solids may be used to produce beads because the process provides means to heat the molten materials or solids being processed.

DELIVERY OF PELLETS TO COOLANT SURFACE

Pellets are discharged from the film of molten material in a single plane and each pellet fans out giving an ever increasing space separating each pellet.

Since the pellets discharge in a single plane, I locate the discharge as close to the surface of the coolant as possible (as close as 1/16 inch to the coolant surface) and thereby deliver the pellets onto the coolant surface with an angle of incidence so small that upon striking the coolant surface the pellet immediately begins to rotate with a minimum of impact and the entire pellet surface is cooled rapidly and uniformly resulting in spherical shapes as little as 0.001 inch out of round as determined on pellets measing 0.030 inch to 0.200 inch diameter (not the limit of sizes).

Pellets of glass may be similarly produced by this method wherein the molten glass flows to the discharge end of the film and is heated well above the last equilibrium temperature just prior to the pelletizing operation.

The glass is heated using either carbon arc or gaseous heat to a point where the molecular cohesion becomes so small because of the high temperature and formation of relatively large gas bubbles within the glass thereby reducing the total glass cross section in the glass film that the glass film ruptures into discrete pellets under the influence of centrifugal force. The pellets are discharged onto the surface of very hot (180° F.) to boiling water where upon the gas bubbles within the pellets are observed to shrink and the glass itself begins to shrink throughout the pellet's mass and eventually the pellet shrinks to a substantially solid form. Because the glass and gases within are superheated to the same degree the pellet shrinks to a compact form from the center of the mass rather than from the surface inward as in prior arts.

I have found that a neutral to oxidizing temperature condition whereby the glass is heated to above 2800° F. and higher and the glass develops a light amber tinge will produce pellets of useful purpose.

Where a cellular product is desired the arc is adjusted, close to the discharge point and so that glass is in the vaporized carbon gas area.

I have found that by proper control of conditions as will be hereafter described in more detail I can produce spherules and crystals that posses characteristics identical with those brought back from the moon's surface.

Since the time when Lunar Soil was first brought to Earth a very intensive study by many scientists has been in progress for the purpose of finding the answer to many questions regarding the chemical composition, the physical properties, the magnetic properties and numerous other unusual properties of Lunar Soil and its individual components. In addition, much effort has been expended trying to determine the mechanisms that produced the spherules, crystals and miscellaneous particles found in the Lunar Soil. Much of the work performed, results of investigations and the conclusions are presented in the "Proceedings of the Apollo 11 Lunar Science Conference", published in three (3) volumes. Volume 1, *Mineralogy and Petrology* is of particular interest because it presents the findings of many scientists and deals with Lunar Soil particles in great detail with very great importance being given to the spherules and crystals in the Lunar Soil. Unfortunately, work had to be conducted on the samples brought from the moon in their natural moon condition. It is known that the size of the spherules and crystals under study range from approximately 3.0 millimeter down to a fraction of a micron (0.001 mm) with the average size of the fines being less than about 0.5 millimeters.

May theories have been advanced as to the mechanism by which these moon spherules and crystals were formed. I have found an apparatus and product which duplicate the moon spherules and crystals. I have reproduced the same characteristics formed on moon spherules and crystals under known and controlled conditions. Of great importance is the fact that I have been able to make these products in both macro and micro sizes. The macro size particles enables scientists to study large scale characteristics in sizes up to approximately ¼ inch with greater detail than is available with the micro size spherules brought from the moon surface.

The following useful and novel products are produced by my process using mineral compositions with or without contained metal:

1. Transparent glassy spheres.

1.1 Colorless, green, very pale yellow spheres are produced under neutral to reducing conditions at temperatures above the point where the solid phase (crystals) are completely dissolved in the liquid phase.

1.2 Amber, brown and dark brown spheres are produced under oxidizing conditions at temperatures above the point where the solid phase (crystals) are completely dissolved in the liquid phase.

2. Transparent glass spheres exhibiting well defined crystals.

2.1 Colorless, green, very pale yellow spheres with well defined crystals in the transparent matrix are produced under reducing conditions at lower temperatures than are used to produce sheres described in 1 above. The temperature range required may be described as that in the middle of the full temperature range spanning the phase diagram for the composition being processed. For blast furnace slags this appears to be approximately 2400° F. to about 2700° F.

2.2 Amber, brown and very dark brown (opaque in larger sizes) spheres with well defined crystals in the transparent matrix are produced at the lower temperatures as described under 2.1 above, but under oxidizing conditions 3. Transparent glassy spheres containing gas bubbles.

3.1 Glassy transparent spheres containing one or a number of randomly scattered voids are produced under reducing neutral and/or oxidizing conditions when molten material containing residual crystals or solid phase in limited quantity is subjected to a slight increase in temperature sufficient to dissolve the crystal followed by a rate of cooling sufficiently rapid to lower the fluidity of the matrix. It has been determined and observed that the solution of crystals in the liquid phase is accompanied by the evolution of a gas. In other words, it has been observed that under the conditions described above, the isolated crystals will be replaced by isolated gas bubbles. This is accomplished by adjustment of heat source in this invention to increase temperatures (slightly) of the molten material just prior to being pelletized.

4. Glassy Brown Colored Spheres With Surface Crystals.

Glassy brown colored spheres that have white crystals (under reflected light) on the surface, partially imbedded crystals in the surface and crystals lying just under the surface covered by a thin glassy layer are normally produced under oxidizing conditions by this invention. This result is readily observed under magnification of 60X to 100X. The crystals vary in shape and size and may appear quartz like or frostly white under reflected light.

The crystals may be described relative to their attachment and location as follows:

4.1 Crystals loosely attached to the sphere surface as by static attraction and which can be readily brushed away the surface.

4.2 Crystals that are firmly attached to the surface by being partially imbedded in the glassy matrix of the sphere.

4.3 Crystals that are completely submerged in the glassy matrix, some of which are covered by only a very thin layer of glassy material.

The crystals described in 4.3 above may be residual crystals existng in the molten material being processed or they may be the results of recrystallizations that occur during the air cooling of the formed spheres.

The crystals described in 4.2 may be residual crystals or products of recrystallization that becomes trapped in the matrix and in the sphere surface during cooling of the sphere.

The crystals described in 4.1 may be residual crystals that are set free at the moment the molten material is disintegrated at the discharge edge of the pelletizing apparatus or they may he crystals that are precipitated from the matrix as they recrystallize during air cooling of the spheres.

The condition described under 4 above is not observed for spheres produced under reducing conditions and high temperature conditions that yield the colorless spheres and pastel colors of green, yellow and light amber spheres.

The condition described in 4 above is normal for spheres produced under oxidizing conditions and particularly when the iron oxide content of the material is highly oxidized and lies in the approximate range of about 5 to 20 percent.

One of the features inherent in my apparatus for pelletizing is the compression of molten material while under restraint within the tube and cone shaped vessel at any temperature followed by the disintegration of the molten material as it leaves the restraint at the discharge edge of the vessel. The molten material is literally torn apart or disintegrated by tension that is developed in the molten material as the material expands radially around the discharge edge.

Under the fluid condition of the molten material that is induced by a highly oxidized iron oxide content the solid phase (crystals) will actually separate from the liquid phase resulting in two distinct products, namely; crystals and spheres.

It is indicated by the appearance of the crystals protruding from the oxidized spheres and by the free crystals simultaneously produced that the oxidized liquid does not wet the crystals and it is further indicated that the crystals are in a state of growth rather than one of dissolving.

5. Glassy Brown Colored Spheres With Metal "Blebs".

"Blebs" are metal attachments or partially submerged metal on or in the surface of a sphere.

The production of spheres exhibiting metal blebs appears to be limited to processing under oxidizng conditions.

The brown colored glassy spheres described under 4 above may also contain metal attachments on the surface or they may contain partially submerged metal "islands" that show on the surface.

I have found the metal blebs to be solely associated with the production of pellets (spheres) by this method and invention from a melt of mineral (such as Blast Furnace Slag) that contains, in addition to metal oxides, metallic metal such as iron, nickel or copper.

Where metal exists in the molten material (entrapped or intentionally added) both the metal and the mineral arrive at the discharge rim where some of the metal is pelletized as individual metal spheres and some of the metal either clings to the mineral sphere by an oxide metal bond or is encased in the mineral sphere.

Under reducing conditions metal will separate from mineral because neither have a great affinity for the other.

Under oxidizing conditions the metal will oxidize and this metal oxide will have a great affinity for the oxides in the mineral liquid, consequently, the spheres in close proximity to the metal at the time of formation will exhibit the metal bleb.

If metal is encased by the mineral in spherical forms the sphere will generally exhibit a large void internally. The metal may be observed protruding through the surface of the sphere or it may be observed inside the cavity in cases where the thin wall of the cavity is broken open.

Metal blebs may appear as roughly spherical shapes attached to the sphere surface by pin point contact or they may appear as lens-like shapes lying on the surface of the mineral sphere or they may appear as protruding islands of metal in the mineral surface.

Generally the point of attachment exhibits as indication that the metal oxide film (surrounding the metal) blends into the surface of the mineral sphere.

The temperature of the metal and the mineral sphere appears to control the shape of the bleb. Temperature just above the melting point of the metal appears to yield the more spherical shaped metal attachements while higher temperatures appear to yield the lens-like shapes.

6. Glassy spheres Exhibiting surface craters.

These spheres are pronounced in the brown and dark brown colors and are indicative of oxidizing conditions.

The following types of craters have been observed on the applicant's product:

6.1 Craters with smooth rounded edges indicative of gas release through the sphere surface with enough residual heat remaining in the sphere to round off the blow hole edges (rim of hole) through surface energy (surface tension).

6.2 Spheres with craters having sharp well defined rims that may protrude.

The sharp protruding rim is indicative of a gas break through as a bubble. In this case the thin wall of the bubble at the surface of the sphere may break leaving a sharp rim at the sphere surface. The temperature of the sphere was insufficient to cause rounding of the rim after the bubble broke through the surface.

6.3 Craters in spheres that contain crystals or white linings. The white particles appear to be recrystallized formations extruded from the surrounding matrix and are in great contrast because of the white color in a dark brown background.

6.4 Glassy spheres with craters surrounded by spalled sphere surface. These are indicative of gas bubbles formed just below the surface of the sphere and which possess sufficient pressure to rupture the covering surface after the sphere surface has contracted and becomes "set" or rigid.

7. Cellular Spheres Containing Uniform size Gas Bubbles.

Glassy cellular spheres with a glassy smooth surface surrounding a frothy interior of uniformly sized voids. The original application describes the production of these spheres by positioning carbon electrodes at the discharge area of the pelletizing vessel. It has been determined that such cellular spheres are produced from glasses and slags because of the following reactions that take place upon application of high heat just before the material disintegrates into pellets.

7.1 Undissolved crystals in the molten material are heated through the point of solution in the liquid phase and are replaced by gas bubbles. The replacement of crystals by gas bubbles has been established by the applicant through visual observations.

7.2 Molten mineral compositions will froth when a molten composition in a reduced state is suddenly subjected to a heat source of oxidizing quality of equivalent or higher temperature. An oxidized slag or glass will froth if suddenly heated by a heat source of reducing quality. This is a reversible process and may be repeated using the same unit of molten material.

8. Micro Sized Spheres

During the production of cellular spheres described in 7 above it has been found that micro sized spheres are produced also. These range in size from about 200 microns down to less than 1 micron.

It has been determined that these micro size spheres (duplications of spheres found in Lunar Soil Samples) are produced when mineral compositions such as blast furnace slags are subjected to high intensity heat sources as electric arc or oxygengas flames. The molten material generally contains entrapped gas bubbles which move and flow with the molten material as it approaches the discharge area and, in this case, the high intensity heat source. The gas bubbles expand rapidly in a thin membrane of the slag. The bubble bursts and the membrane flies outwardly and each small membrane section immediately spherodizes to form micro sized spheres and are carried out of the hot zone by the arc stream or high velocity gases of the oxygen-gas flame.

When entrapped metal exists in the molten material being processed micro sized spheres of metal and the metal oxide are also produced along with spheres of the predominant mineral composition.

9. Elongated Shapes or Dumb bells.

Elongated shapes such as those found in Lunar Soil Samples are produced in the practice of this invention in the following manner.

Molten slag (example blast furnace slag) is processed through the rotating vessel as described in the specifications and allowed claims.

At the discharge rim or edge of the vessel a single heat source (carbon arc for example) is positioned so that the heat therefrom is concentrated at one point on the periphery of the rim. As the vessel rotates, the molten film of slag passes under the single heat source and is heated above the pelletizing (spherodizing) temperature.

When the normal flow of slag is processed at a high temperature and at a reduced rate of flow and the pelletizer is operated at high rotational speed small spheres will be produced.

When the temperature of the normal flow of slag is reduced to the point where the slag begins to string out at the discharge rim slight elongations will appear at the discharge point. If the single high intensity heat source is placed into operation the slight elongations will be reheated quickly and each elongation will melt away from the point of attachment to the film of slag at the rim and will be discharged therefrom as an elongated shape having a length of two or more times the diameter. As the heated point on the rim moves from under the single heat source the attached elongations previously described form again and remain on the rim until they are melted by passing under the single heat source The principle is this:

Elongations are formed under low temperature conditions, but high enough to permit plastic flow. The mineral will tend to string out or elongate as long as it is attached at one end. This may occur by centrifugal force or in a flow of gas at just the right "stringing" temperature. If the elongated shape is suddenly heated at its point of attachment it will separate therefrom and as it flies through the air it will cool so that only the detached end will round-up and the detachment will retain its elongated shape. The elongated shape must be elongated prior to being discarged into the air otherwise flow within the unit would take place in more than one plane and a distorted shape would result.

While I have set out certain preferred practices and embodiments of my invention in the foregoing specification, it will be understood that this invention may be otherwise practiced within the scope of the following claims.

I claim:

1. A glass generally spherical glass particle containing non-continuous integral crystalline matrix derived elements each one being at least partially enclosed within said glassy particle.

2. A generally spherical glass particle as claimed in claim 1 in which the crystalline elements are substantially pure metals.

3. A generally spherical glass particle as claimed in claim 1 wherein the crystalline elements are totally enclosed within said glassy particle.

* * * * *

UNITED STATES PATENT AND TRADEMARK OFFICE
CERTIFICATE OF CORRECTION

PATENT NO. : 4,113,915

DATED : September 12, 1978

INVENTOR(S) : Charles W. Schott

It is certified that error appears in the above-identified patent and that said Letters Patent are hereby corrected as shown below:

Title page, last line, "6 Drawing Figures" should be --7 Drawing Figures--.

Column 2, line 18, after "foregoing", --general-- should be inserted.

Column 5, line 46, "cae" should be --case--.

Column 6, line 19, "ass" should be --as--.

Column 7, line 3, "lowr" should be --lower--.

Column 7, line 61, "pelletes" should be --pellets--.

Column 9, line 50, "sheres" should be --spheres--.

Column 9, line 60, a period should be inserted after "conditions".

Column 10, line 19, "frostly" should be --frosty--.

Column 10, line 25, after "away", --from-- should be inserted.

Column 10, line 34, "existng" should be --existing--.

UNITED STATES PATENT AND TRADEMARK OFFICE
CERTIFICATE OF CORRECTION

PATENT NO. : 4,113,915
DATED : September 12, 1978
INVENTOR(S) : Charles W. Schott It is certified that error appears in the above-identified patent and that said Letters Patent are hereby corrected as shown below:

Column 11, line 13, "oxidizng" should be --oxidizing--.

Column 11, line 50, "as" should be --an--.

Column 11, line 56, "attachements" should be --attachments--.

Column 12, line 44, a period should be inserted after "Spheres".

Column 12, line 53, "oxygengas" should be --oxygen-gas--.

Column 14, line 13, "discarged" should be --discharged--.

Claim 1, column 14, line 22, "glass" (first occurrence) should be deleted.

Signed and Sealed this

Sixth Day of March 1979

[SEAL]

Attest:

RUTH C. MASON
Attesting Officer

DONALD W. BANNER
Commissioner of Patents and Trademarks